Oct. 27, 1953  P. T. O'NEIL  2,657,344
RECTIFIER STACK
Filed Sept. 14, 1951
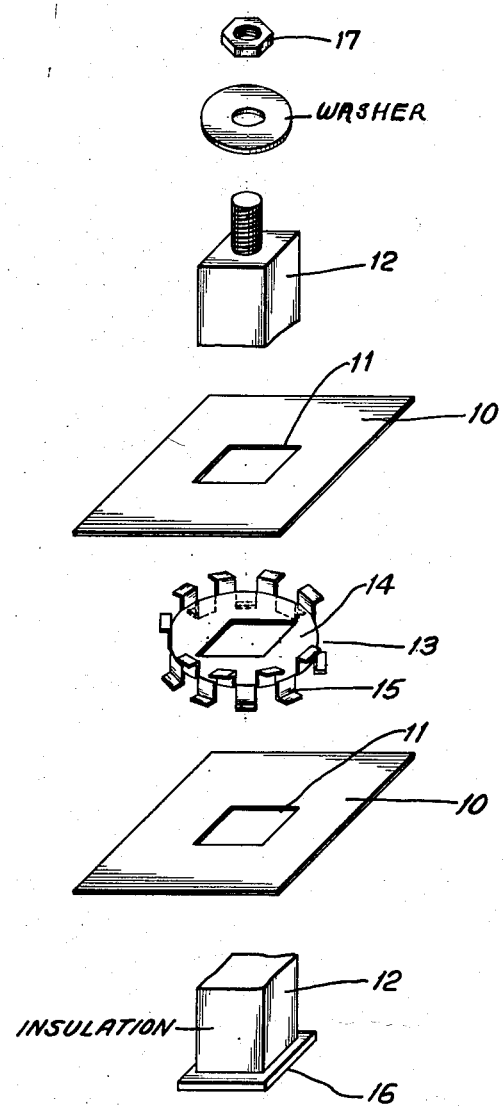
INVENTOR.
P. T. O'NEIL
BY  RPMorris
ATTORNEY.

Patented Oct. 27, 1953

2,657,344

UNITED STATES PATENT OFFICE 2,657,344

RECTIFIER STACK

Paul T. O'Neil, Englewood, N. J., assignor to Federal Telephone and Radio Corporation, New York, N. Y., a corporation of Delaware Application September 14, 1951, Serial No. 246,553

3 Claims. (Cl. 317—234)

This invention relates to rectifier stack construction, and particularly to constructions avoiding high assembly pressures between the spacer connectors and the rectifier disks.

The rectifier industry and particularly the selenium rectifier industry, have been continuously troubled since their inception with problems of breakdown, short circuiting and improper alignment in the rectifier stack. The selenium rectifier commonly used today, comprises a plurality of rectifying disks mounted on an insulated bolt by means of a hole through the center of each disk. Electrical contact between the disks is made by interspaced contact washers respectively interconnecting the supporting plates of each of the disks to the counter-electrode of the electrically aligned adjacent disk insulating washers are provided to properly space the disks and temper the pressure that is exerted on the counter-electrode when the assembly bolts are tightened. The amount of pressure required is determined by the amount of pressure necessary to maintain good electrical contact and to maintain a rigid assembly. Rigid assembly of the parts is necessitated in order that proper mechanical alignment between the disks be maintained, i. e., the disks once aligned should not be permitted to rotate about the bolt or shank. Obviously the pressure required between the contact washer and the counter-electrode to prevent the disk from rotating is high and it is because of this requisite high pressure that many very significant difficulties exist. For example, this pressure causes appreciable wear in the counter-electrode by the washer, thus causing the counter-electrode, and consequently the rectifier stack to frequently break down. Another example of the pressure producing difficulties arises when the washer, being pressed against the counter-electrode, causes the counter-electrode to penetrate the thin layer of solenium causing contact between the counter-electrode and the supporting plate, and resulting in a short circuit.

There have been many suggestions for solving these problems, but heretofore the suggestions have only created other difficulties and in some instances difficulties more grave than the original shortcomings. For example, it has been proposed to insulate a small area, around the assembly hole, between the counter-electrode and the selenium layer, making contact with a flat metal washer in the endeavor to prevent point break through. However, this method requires a large number of operations in manufacturing the stack and therefore considerably increasing the cost. Further the difficulty of excessive wear between the washer and the counter-electrode has not been obviated because high assembly pressure must nevertheless be applied to prevent rotation of the disk around the shank.

The object of this invention is to correct the above mentioned shortcomings by providing rectifier disks and contacting members with openings of a particular configuration to register with a shank of similar configuration, the configuration being such as to prevent rotation of the disks without the aid of external pressure.

According to the invention, applicant provides a rectifier stack construction comprising at least one rectifier disk having a non-circular opening, a contact member having a non-circular opening, and a non-circular shank registering with the openings and supporting said disk and contact member; thus relative rotation between the disk and contact member is being prevented solely by the non-circular openings in the disk and contact member nesting with the non-circular shank, therefore obviating the need for pressure to maintain proper alignment. Although it is preferred to form the contact member with a square opening, it is not essential to the invention because the disks nesting with the shank eliminates relative rotation between those two members and makes it extremely improbable for the contact member to have relative rotation since it is not exposed to rotational forces. The pressure required is only the pressure necessary for proper contact. In addition to the enhanced durability of the rectifier, the absence of high pressure has also served to improve the characteristics of the rectifier and in particular, the reverse current characteristics.

A feature of applicant's invention is to provide spacer connectors which serve to space, and electrically connect the disks without the need of insulating spacer washers, or the like.

The above mentioned and other features and objects of this invention and the manner of attaining them will become more apparent and the invention itself will be best understood, by reference to the following description of an embodiment of the invention taken in conjunction with the accompanying drawing, wherein the figure is an exploded view of the invention. Referring to the figure the rectifier stack comprises a plurality of rectifier disks 10 having non-circular openings 11. By way of example the non-circular openings are illustrated as square openings. Obviously the invention would operate with equal facility with most any non-circular opening, e. g., triangular or elliptical openings. The rectifier disks 10 nest with and are supported on a shank 12, having the same configuration as the opening 11. The shank may be made from any suitable insulating material such as bakelite, or a metal core having an insulating sleeve. Spacer connectors 13 comprising a circular plate 14 as the main body portion, has a plurality of spider type legs 15 alternately disposed in opposite directions with respect to the plane of the circular plate 14. The spacer connectors serve the dual function of properly spacing and electrically connecting adjacent disks 10.

In assemblying the rectifier stack one or more rectifier disks, depending on the voltage and circuit requirements, are mounted on the insulated non-circular shank 12 by means of the openings 11 through the center of the rectifier disks 10. The shank is provided with a head 16 which is of larger external dimensions than the shank 12 and serves to support the lowermost disk 19. The spacers and additional disks are assembled in their proper electrical order and are securely held together by any of the well known means, for example, a bolt and nut arrangement 17, the bolt extending from the shank 12.

Although the disks are illustrated to be rectangular, it is obvious to those skilled in the art that the rectifier disks may have other suitable shapes.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A rectifier stack comprising a plurality of rectifier disks having non-circular openings, a unitary means for properly spacing and connecting adjacent disks, a non-circular insulating shank registering with the openings in said disks and supporting the disks in assembled electrical relationship, the disks being prevented from rotation principally by the action of the non-circular openings in said disks nesting with the non-circular shank.

2. A rectifier stack comprising a plurality of rectifier disks having centrally located non-circular openings; a plurality of spacer connectors, each of said spacers comprising a circular plate having a plurality of spider type legs alternately disposed in opposite directions with respect to the plane of said plate, the legs serving to space and connect adjacent disks; a non-circular insulating shank registering with the openings in said disks and supporting the disks and spacers in assembled electrical relationship, the non-circular openings in said disks nesting with the non-circular shank thereby preventing the disks from rotating around said shank.

3. A rectifier stack comprising a plurality of rectifier disks having centrally located non-circular openings; a plurality of spacer connectors having non-circular openings, each of said spacers comprising a circular plate having a plurality of spider type legs alternately disposed in opposite directions with respect to the plane of said plate, the legs serving to space and connect adjacent disks; a non-circular insulating shank registering with the openings in said disks and spacers and supporting them in assembled electrical relationship, the non-circular openings in said disks nesting with the non-circular shank thereby preventing the disks from rotating around said shank.

PAUL T. O'NEIL.

References Cited in the file of this patent

UNITED STATES PATENTS

| Number | Name | Date |
|---|---|---|
| 1,801,836 | Aumann | Apr. 21, 1931 |
| 2,114,898 | Dormoy | Apr. 19, 1938 |